United States Patent

Jackson et al.

[11] Patent Number: 6,089,357
[45] Date of Patent: Jul. 18, 2000

[54] DUAL PISTON SWING BRAKE SYSTEM FOR CRANES

[76] Inventors: David C. Jackson; J. Alan Jackson, both of 9260 Broken Arrow Expressway, Tulsa, Okla. 74147-1617

[21] Appl. No.: 08/941,380

[22] Filed: Sep. 30, 1997

[51] Int. Cl.[7] .................................................. F16D 55/02
[52] U.S. Cl. ..................... 188/71.6; 188/71.5; 188/72.4; 188/264 F
[58] Field of Search .................. 188/170, 71.5, 188/71.6, 264 E, 264 F, 264 R, 72.3, 72.4, 106 P

[56] References Cited

U.S. PATENT DOCUMENTS

| | | |
|---|---|---|
| 3,770,085 | 11/1973 | Cottingham ............................. 188/170 |
| 3,838,756 | 10/1974 | Pottorff . |
| 3,844,625 | 10/1974 | Ingram et al. . |
| 3,863,038 | 1/1975 | Kreitner et al. . |
| 3,941,219 | 3/1976 | Myers . |
| 3,954,305 | 5/1976 | Ingram et al. . |
| 3,967,706 | 7/1976 | King ....................................... 188/170 |
| 3,968,864 | 7/1976 | Deichsel et al. . |
| 3,974,896 | 8/1976 | Rach . |
| 4,018,140 | 4/1977 | Engle . |
| 4,024,936 | 5/1977 | Crabb . |
| 4,037,878 | 7/1977 | Zyduck . |
| 4,057,297 | 11/1977 | Beck et al. . |
| 4,100,973 | 7/1978 | Freudenthal ............................. 188/170 |
| 4,116,307 | 9/1978 | Reinecke . |
| 4,215,767 | 8/1980 | Shirey . |
| 4,263,991 | 4/1981 | Morgan et al. . |
| 4,447,044 | 5/1984 | Nakata . |
| 4,560,034 | 12/1985 | Windish et al. . |
| 4,588,057 | 5/1986 | Weich et al. . |
| 4,607,730 | 8/1986 | Paisley . |
| 4,658,937 | 4/1987 | Enomoto . |
| 4,667,784 | 5/1987 | Cronin ..................................... 188/170 |
| 5,174,420 | 12/1992 | DeWald et al. .......................... 188/170 |
| 5,215,170 | 6/1993 | Rapa . |
| 5,253,737 | 10/1993 | Klaue . |
| 5,333,705 | 8/1994 | Lemaire et al. ......................... 188/170 |
| 5,601,160 | 2/1997 | Horsch . |

FOREIGN PATENT DOCUMENTS 2823038  12/1978  Germany ................................ 188/170

*Primary Examiner*—Paul N. Dickson
*Assistant Examiner*—Devon Kramer
*Attorney, Agent, or Firm*—William S. Dorman

[57] ABSTRACT

The present invention relates generally to a hydraulic braking system for use in equipment such as cranes that rotate about a fixed base. The braking system described herein utilizes a twin piston hydraulically activated system wherein separate service and parking brake pistons are applied to opposite sides of a common brake pack. The two braking pistons may be independently actuated. The brake pack consists of interleaved rotor disks (friction disks) which are splined to a central rotating shaft and stationary (stator) disks which are secured against movement by interlocking them with the casing of the device. The brake pack is movable axially such that in operation an active parking brake piston presses against the brake pack which moves until it is supported on its reverse face by a passive service brake piston. Similarly, when the service brake is applied the brake pack moves and is supported on its opposite face by a passive parking brake piston.

5 Claims, 8 Drawing Sheets

DUAL PISTON SWING BRAKE SYSTEM FOR CRANES

FIELD OF THE INVENTION

The present invention relates to hydraulic brakes for use in stopping the rotation of a crane about its base, and to speed reducers in general. It relates more particularly to the use of a dual piston parking and service braking system in which the service and parking brake pistons are independently actuated and contact the brake pack from opposite sites thereof.

BACKGROUND

A problem that has drawn the attention of many inventors is that of slowing and/or stopping the rotation of a crane about its base through the use of hydraulic brakes. More generally, these same sort of brakes might be applied in any situation wherein a rotating shaft is to be braked and a metered dynamic braking response is desired. Broadly speaking, there are two sorts of brakes that are useful with machinery such as cranes. The first is a service or operating brake which is applied intermittently by the operator to control the crane's rotational motion while payloads are being moved. The second brake is a parking or emergency brake which is ordinarily engaged when the vehicle is left unoccupied. Additionally, some variations of the parking brake double as an emergency or fail-safe brake that engages when a hydraulic or other mechanical failure arises during operation. It is desirable in many circumstances that both types of brakes be available within the braking unit.

One of the most common braking systems encountered in the crane rotational braking arts is a hydraulically actuated disk-type brake, wherein a brake pack which contains interleaved stator disks (or just "stators") and rotators (or friction disks as they are also called) is compressed by one or more braking pistons. In those braking systems that offer both a parking and an operating type brake, it is customary to use either one or two pistons to accomplish these two purposes, single and dual pistons systems respectively, hereinafter.

In single piston braking systems, the operating and parking brake functions are performed by a single piston. It is well known to those skilled in the art that a single piston system is prone to give erratic braking results during service braking, at least until the operator "learns" a particular system. In more particular, when a single piston system is disengaged from "park," the braking piston must be moved some distance away from the braking media. When the operating brake is thereafter applied, the same piston must then travel an equivalent distance—in the opposite direction—to reengage the brake. From the operator's perspective, this can result in a brief period of time during which the brake pedal has no "resistance," followed by a sudden contact of the piston with the braking media and a resulting abrupt cessation of the crane rotation, i.e., overbraking. The typical single piston system might be described broadly as lacking a proportional braking feel, such as the feel one encounters in an automobile-type braking system. The ideal brake is one that has a firm feel, together with a braking responses that is proportional to the amount of pressure applied to the brake pedal.

Dual piston braking systems, on the other hand, have the potential to improve on the operating problem discussed previously by using separate operating and parking pistons. In theory at least, by using two braking pistons the service brake piston may be permanently positioned a distance away from the braking media that is a small fraction of the separation distance normally required for the parking brake piston. This has the potential to produce more uniform braking results, as the time required for the operating brake piston to move and engage the braking media can be made to be virtually imperceptible. From the operator's standpoint, this arrangement can result in a more consistent braking feel.

In some dual piston systems the parking brake contacts the brake pack only indirectly, e.g., though pressure on the operating brake piston—some have referred to this as a "series" arrangement. That is, the parking brake is applied by impelling the parking brake piston to push against the service brake piston, thereby moving the later to contact the braking pack—see e.g. Rach U.S. Pat. No. 3,974,896. Thus, in these sorts of systems the parking brake does not contact the braking pack directly, but only indirectly through the pressure on the top of the operating brake piston. An obvious disadvantage of these sorts of systems is that if the service brake becomes damages or unusable, that can also hamper or prevent the application of the parking brake.

The conventional wisdom seems to be that a dual piston system should have both pistons applied from the same side of the brake pack. Windish et al., U.S. Pat. No. 4,560,034 teaches that to do otherwise would require a greater amount of space and require having the entire friction disk-pack movable axially, the later factor apparently making this approach unpractical in his opinion. Others, e.g., Morgan et al. U.S. Pat. No. 4,263,991, have a dual piston system with the two pistons arranged on opposite sides of the brake pack, but wherein the actual braking force for both the parking and service brakes are applied from a single side of the brake pack.

However, dual piston systems wherein the pistons are applied from the same side of the brake pack have their own problems. The problems with a series-type two piston arrangement have already been discussed. In non-series systems, placing two pistons on the same side of the brake pack means that they must be interrelated in some fashion. For example, one possible arrangement would be to nest one piston inside of the other. However, this arrangement complicates the problem of separately activating the two pistons, as hydraulic pressure must somehow be independently brought to the inner piston. Nested piston systems are necessarily more complex mechanically, a factor which may decrease the reliability of the overall brake.

In systems that feature a parking brake it is not uncommon to design that brake to operate as a fail-safe device which is automatically applied in the absence of hydraulic pressure. These sorts of brakes are often spring actuated, the springs being designed to force the parking brake piston into the brake pack. (Typical spring constants for these sorts of springs might be in the neighborhood of 1000 pounds per inch of compression). Thus, in the absence of any outside forces, the parking brake will be forced automatically against the brake pack and the crane's rotation will be retarded. When the crane is operated, however, some provision must be made for disengaging the parking brake piston from contact with the brake pack. A common approach to doing this is through the introduction of a hydraulic force that is in opposition to the force exerted by the compressed springs. This lifts the parking brake piston away from the brake pack by further compressing the springs, thereby allowing the crane to rotate. If the hydraulics of the crane fail for any reason, the parking brake will automatically reengage and the crane's rotation will be stopped.

What is needed, then, is a two piston hydraulic braking system for use with cranes wherein the pistons may be independently actuated and which has proportional braking feel. Additionally, the system should be as simple as possible mechanically and fit within a typical crane rotation box.

Before proceeding to a description of the instant invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

The invention disclosed herein pertains generally to a dual piston hydraulic braking apparatus which may be used with a crane or similar machine to retard or stop its horizontal rotation about a base. This invention functions generally as a speed reducer and is designed to give a metered dynamic braking response when engaged by the machine operator. More particularly, the instant invention is a dual piston braking system with separate pistons for the service and parking brakes, wherein the service and parking brake are applied from opposite sides of a single brake pack—i.e., they are applied in opposition to each other. In operation, an active brake piston compresses a brake pack against the other (passive) brake piston, thereby producing a braking effect. To accomplish this result, the inventors have utilized a brake pack that is axially movable. Additionally, the parking and service brakes are preferably operated from via independent hydraulic sources. Also, the design is such that the brake may comfortably be fitted within a conventional crane rotation box. Finally, in the preferred embodiment the parking brake is spring actuated such that a failure in the hydraulic pressure of the crane will result in automatic reapplication of the parking brake.

According to a first aspect of the present invention, there is provided a dual piston apparatus for braking the rotation of a crane about its base which utilizes two pistons that are applied in opposition against a common brake pack. By way of explanation, the preferred brake pack for the device disclosed herein consists of a collection of interleaved stators and friction disks, stators and friction disks being the fixed and rotating components, respectively, of the brake pack. A friction disk is generally circular in shape and contains a circular central aperture. These disks might be composed of many different materials, but in the preferred embodiment they are made of metal with a surface onto which paper particles have been bonded. The friction disks contain teeth on their inner diameter that mate with corresponding vertical grooves on the exterior of a brake driver, which the friction disks are coaxial with and encircle. Rotation of the crane about its base is communicated into the braking unit by a connection that terminates within the brake driver: rotation of the crane unit is reflected in a concomitant rotation of the brake driver. The friction disks, because of their link to the brake driver, also rotate when the crane rotates. Similarly, a retardation in the rotation of the friction disks is communicated back through the brake driver and is ultimately reflected by a retardation in the rotation of the crane.

The preferred stators for use with this invention are composed entirely of a metal such as steel. The stators do not rotate in response to crane rotation and are preferably held in place by interlocking them with the external casing of the instant invention. A stator is generally circular in shape with a circular central aperture, but it may have protrusions or splines on its periphery for interlocking it with the interior wall of the casing. The stators are coaxial with and encircle the brake driver, but they have no physical connection with that element.

In operation, the brake (either service or parking) is engaged by forcing a piston against the brake pack which in turn retards the rotation of the brake driver. Within the brake pack, pressure against an outside stator is transferred to an adjacent friction disk, which in turn presses against a next stator, which then contacts a next friction disk, etc. Compression of the brake pack generates friction between its layered components, thereby retarding the rotation of the friction disks and the brake driver to which they are attached. Since rotation of the brake driver is ultimately coupled to rotation of the crane about its base, retardation of the brake driver rotation will also tend to stop the crane rotation.

The parking brake piston is designed to activate automatically when hydraulic pressure to it is removed. By installing one or more compressed coil springs between the parking brake piston and the brake housing top member, the parking brake piston may be impelled to automatically engage the brake pack in the absence of countervailing hydraulic pressure. In the preferred orientation, the parking brake piston is coaxial with the brake pack and engages it on its upper surface. When the crane is to be put into operation, the operator activates the parking brake hydraulic system, thereby supplying sufficient hydraulic pressure to the side of the parking brake piston opposite the springs to further compress them and disengage the parking brake piston from the brake pack. Because this piston functions only as a parking brake, it can be positioned the optimum distance from the brake pack for that particular function.

The service brake piston is installed in an orientation opposite to that of the parking brake piston and on the other of the same brake pack. Thus, each piston contacts the brake pack from a different side. In the absence of hydraulic pressure, the service brake piston will be disengaged from the brake pack, thereby allowing the crane to rotate freely. When the crane operator presses the foot brake, hydraulic pressure is supplied to the service brake piston which forces it to move upward and engage the brake pack from below. The service brake hydraulic circuit is designed to operate independently from that of the parking brake. The service brake piston may be positioned a distance from the brake pack that is optimum for that function, thereby providing a braking response that is proportional.

Because of the relative orientation of the pistons, the brake pack has been designed to be movable axially. That is, when the parking brake is applied it moves the entire brake pack until the side of the brake pack opposite the parking brake piston encounters the service brake piston, the service brake piston providing a support against which the brake pack is pressed. Thus, the brake pack is compressed between an active parking brake piston and a passive service brake piston. Similarly, when the service brake is applied the brake pack is compressed between an active service brake piston and a passive parking brake piston.

In addition to the other advantages recited above, the two-piston arrangement described previously is simpler mechanically than many others as a consequence of the positioning of the pistons on opposite sides of the brake pack. Because of its simplicity, this brake can be made to fit with the limited space inside a crane rotation box.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

DETAILED DESCRIPTION OF THE PREFERRED EMBODIMENTS

Figure 1:
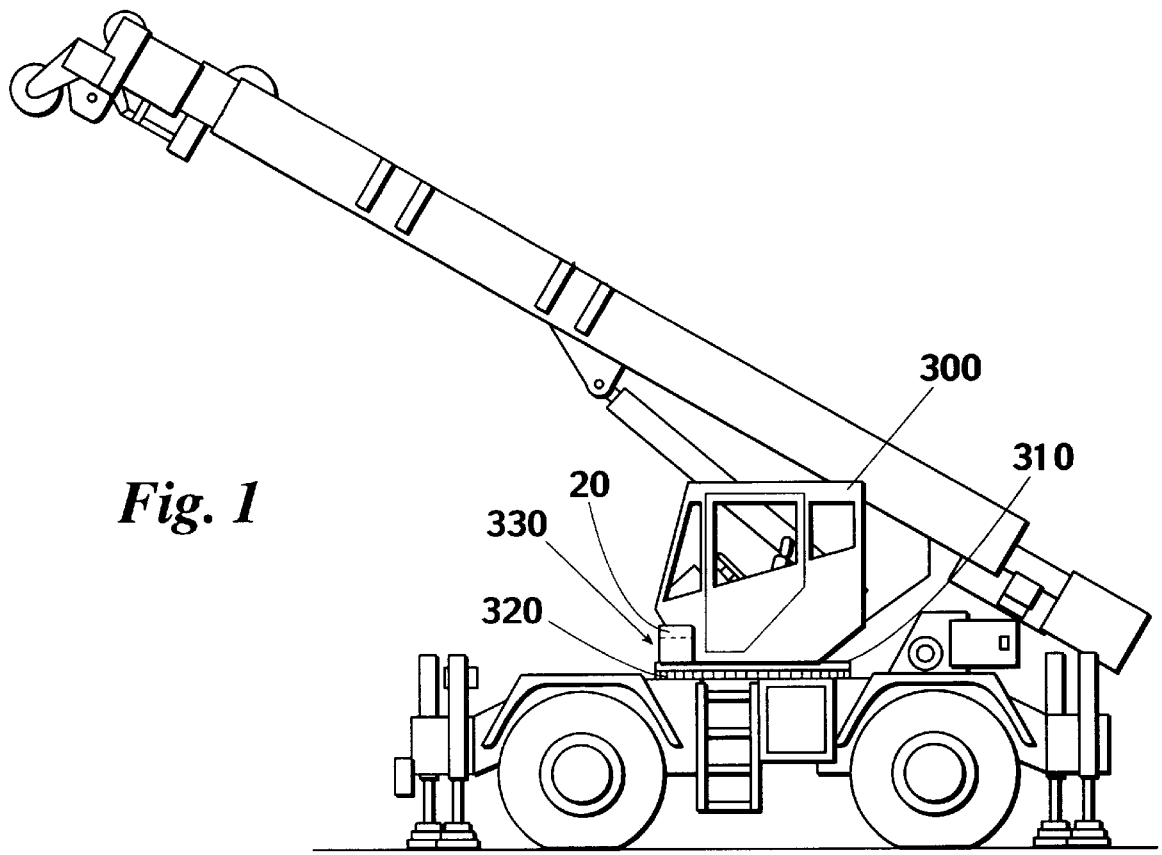
FIG. 1 is a drawing that illustrates the general environment wherein a dual piston hydraulic brake is preferably applied.

Referring to the drawings in detail, wherein like numerals denote identical elements throughout the several views, there is shown in FIG. 1 the general environment in which the instant two-piston hydraulic brake might be applied. As is generally indicated in that figure, in a typical crane arrangement the operator's cab 300 sits atop—and is bolted to—a large circular metal disk (the mast 310) which might be 2 inches thick and five feet or more in diameter. The mast 310 in turn rests upon a large rotation bearing 320, which bears cog-type teeth on its outer surface. The outer portion of the rotation bearing 320 is bolted to the vehicle, whereas the inner portion is bolted to the mast 310, thereby providing a mechanism by which the cab 300 can be made to rotate with respect to the vehicle. The mechanical force which rotates the cab is provided by rotation box 330, which also incorporates the braking system 20 and a surmounting motor (not shown) as the top portion thereof. When the crane operator so directs, the motor within the rotation box 330 turns a metal shaft (not pictured) which bears cogs on its lower end that are matched to and engage the teeth on the exterior of the rotation bearing 320. Forced rotation of the shaft thus causes the cogs on its lower end to walk around the exterior of the rotation bearing 320, thereby rotating the mast 310 and the cab that sits thereon. This gearing arrangement is referred to by those skilled in the art as a spur gear arrangement.

Figure 2:
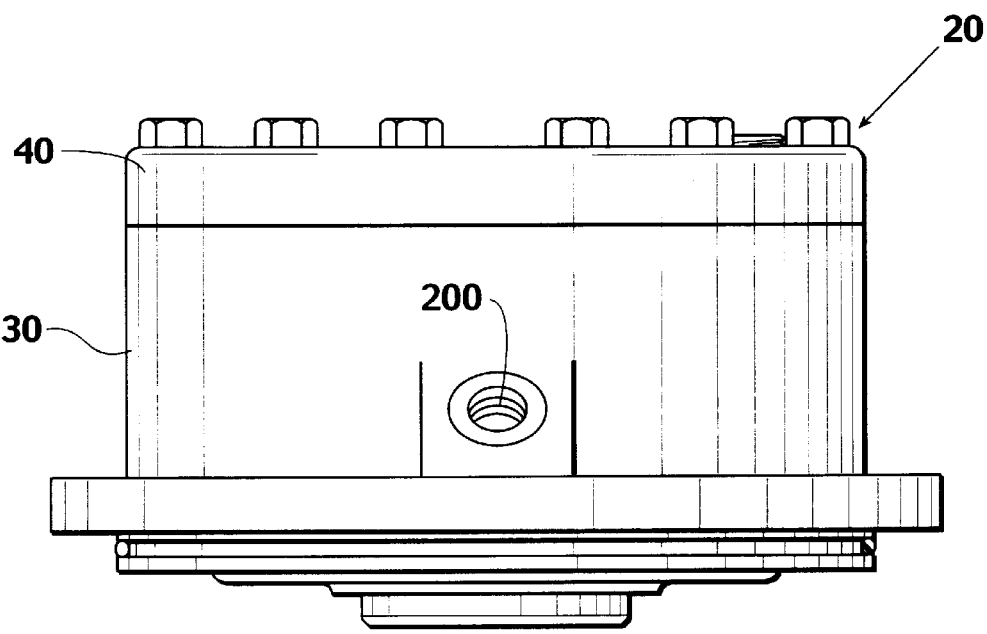
FIG. 2 is a side view of the exterior of the casing that encloses the device.
Figure 4:
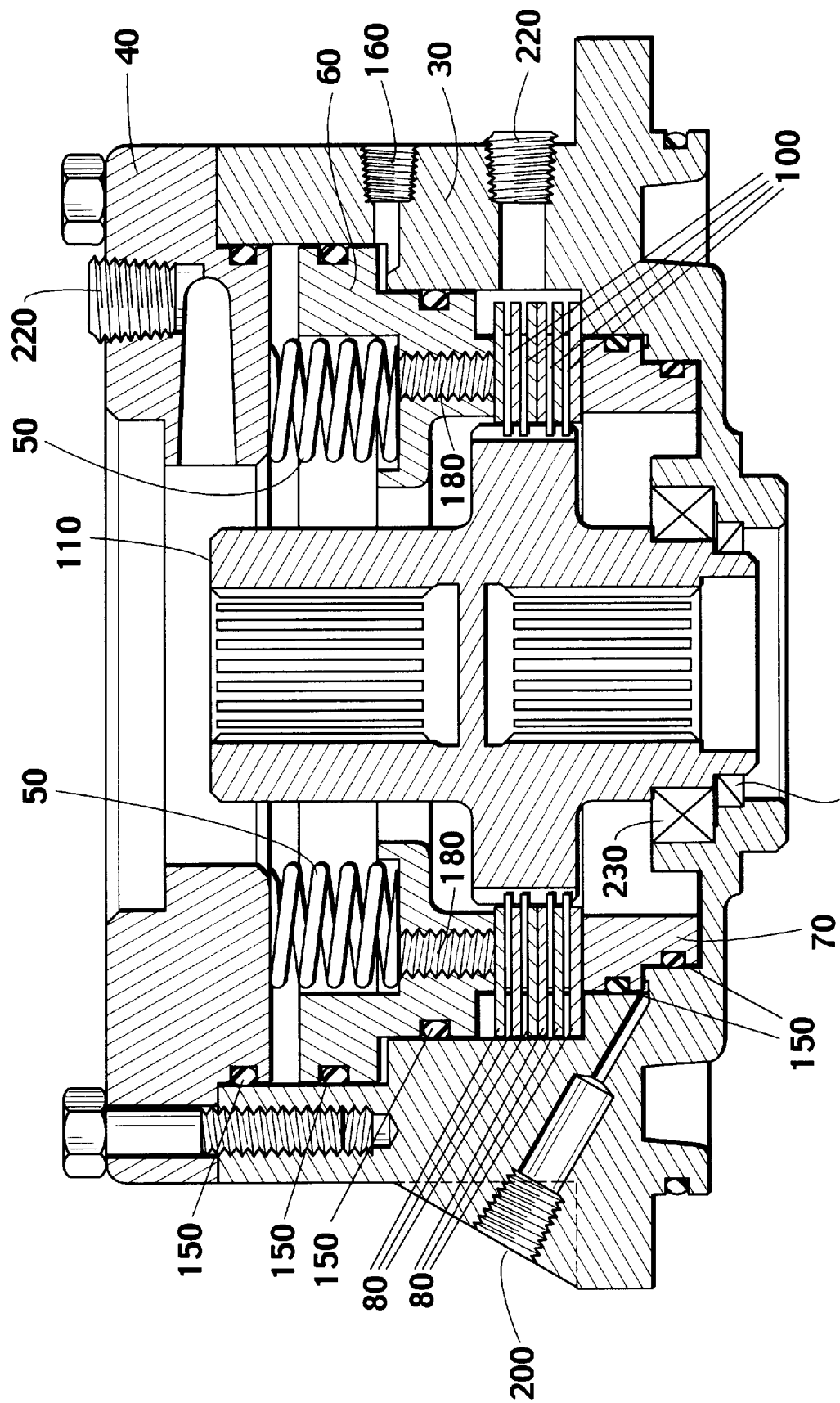
FIG. 4 is a cross sectional view of the instant invention, wherein the parking brake is pictured as being engaged.
Figure 5:
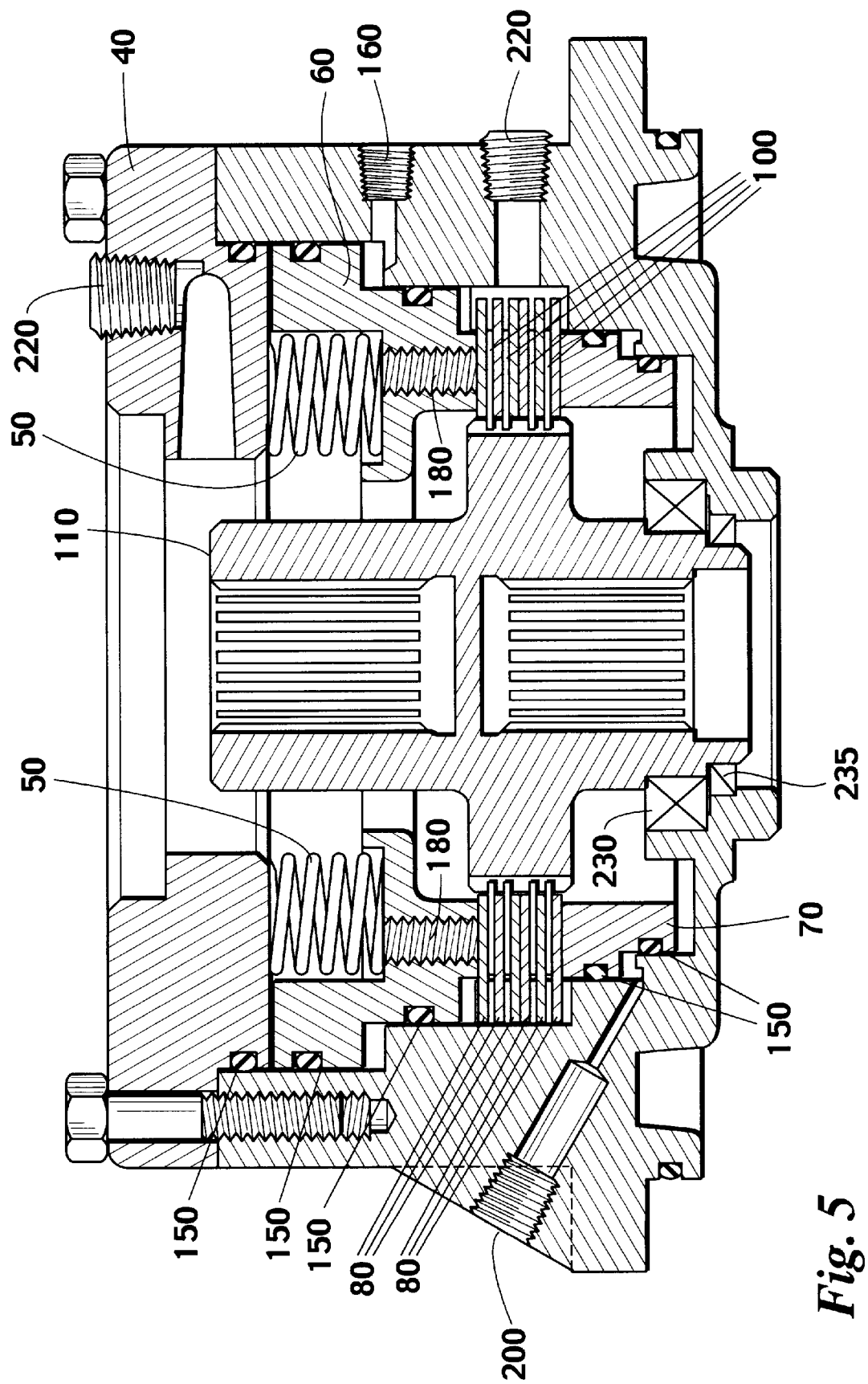
FIG. 5 is a cross sectional view of the instant invention, wherein the service brake piston is pictured as being engaged.
Figure 6:
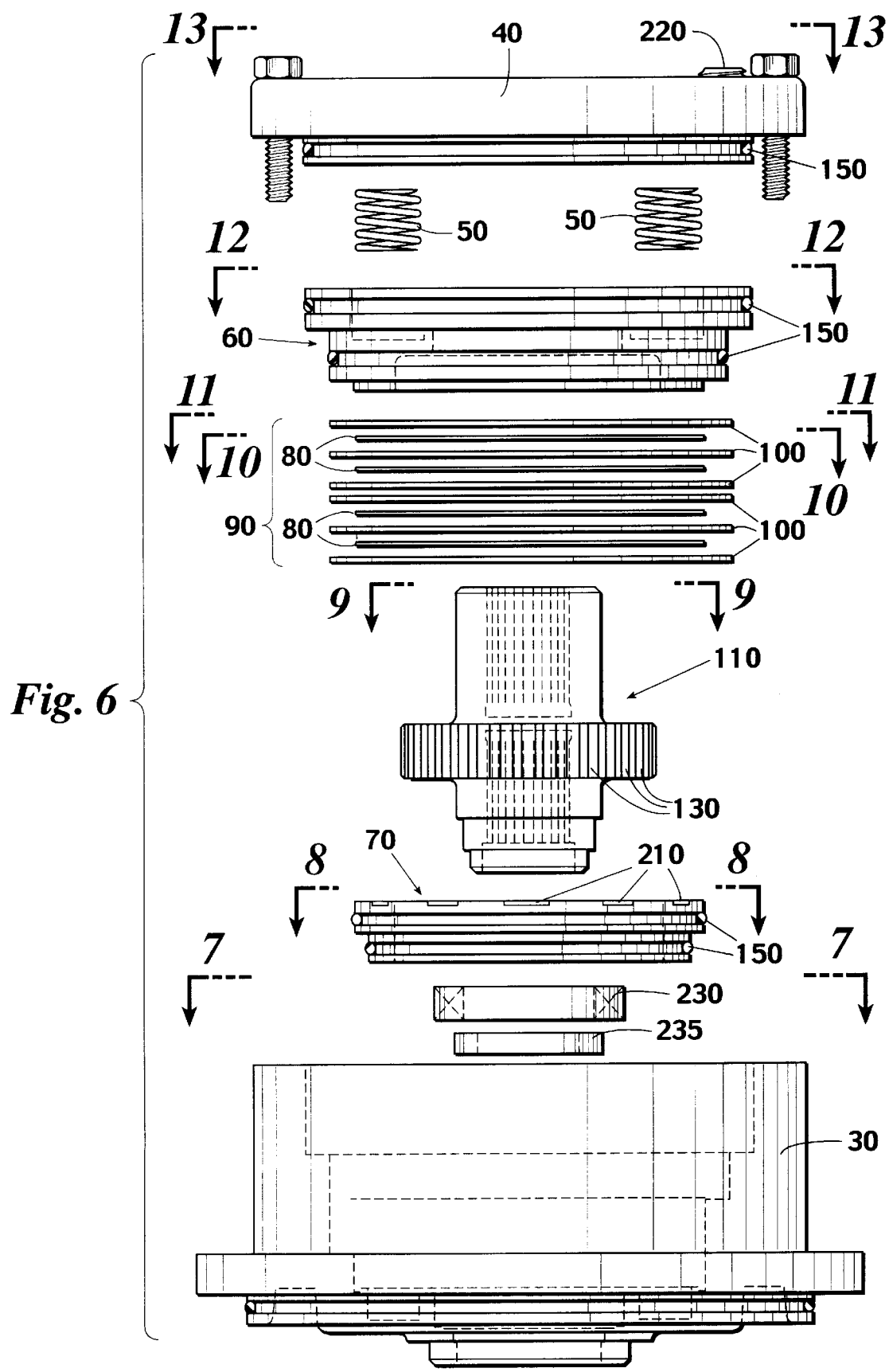
FIG. 6 is an exploded view of the instant invention.
Figure 8:
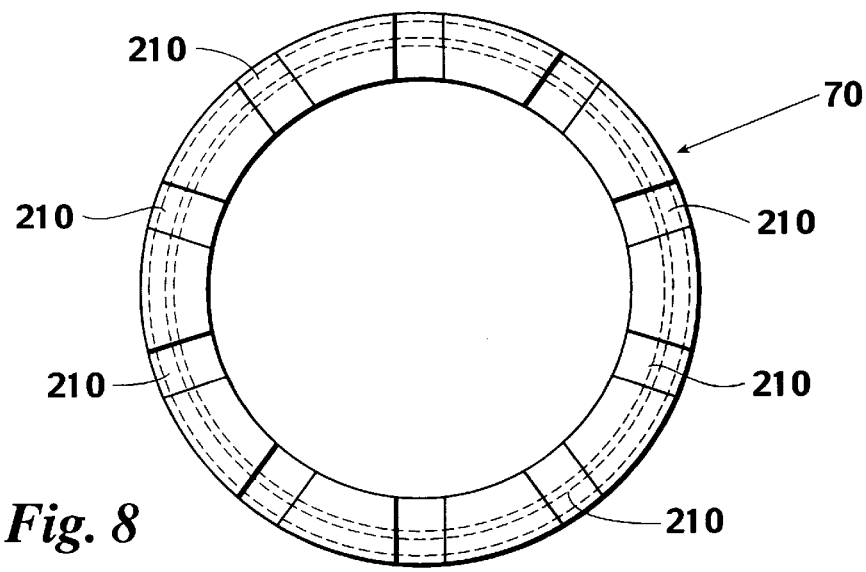
FIG. 8 is a top elevational view of the service brake piston.
Figure 7:
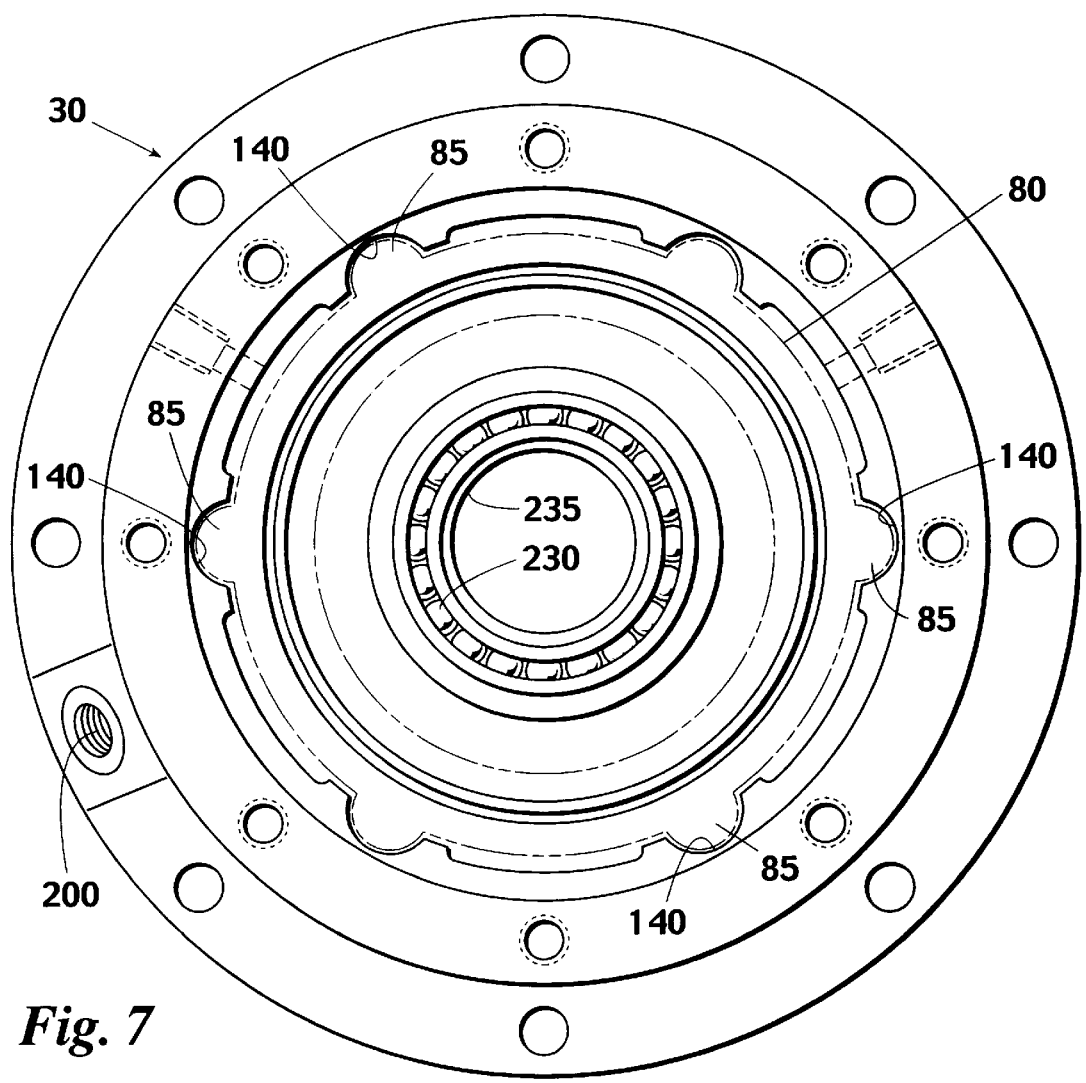
FIG. 7 is an interior view of the lower portion of the casing of the instant invention
Figure 9:
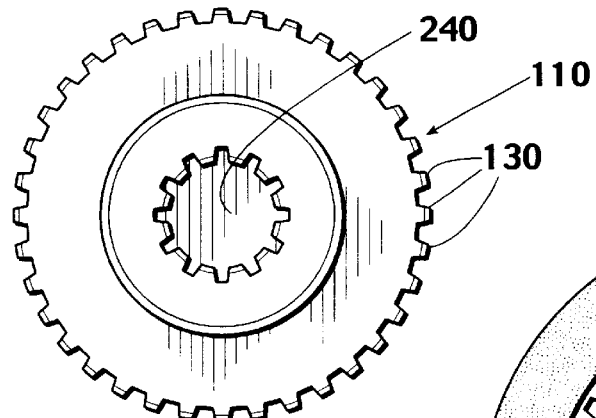
FIG. 9 is a top view of the brake driver.

Turning now to FIGS. 2 through 13, wherein the instant invention is illustrated in greater detail, the braking system 20 is encased in a rigid housing 30 with removable housing top member 40 (FIG. 2). As is best illustrated in FIG. 6, housing top member 40 is secured to the housing 30 by a plurality of heavy hex bolts. When top member 40 is installed it is forced downward by tightening these bolts, it compresses springs 50 which are installed between top member 40 and parking brake piston 60. The springs 50 then apply a constant downward pressure against the parking brake piston 60, the importance of which will be discussed hereinafter.

Figure 10:
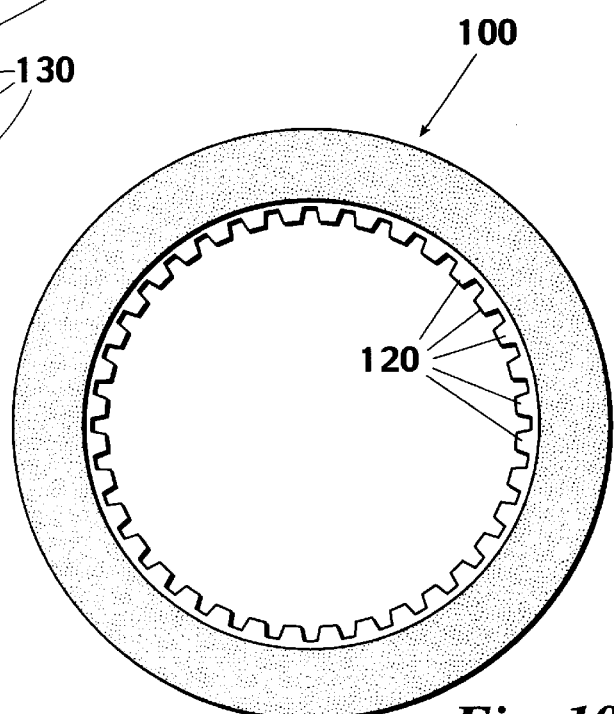
FIG. 10 is a top elevational view of a friction disk.
Figure 13:
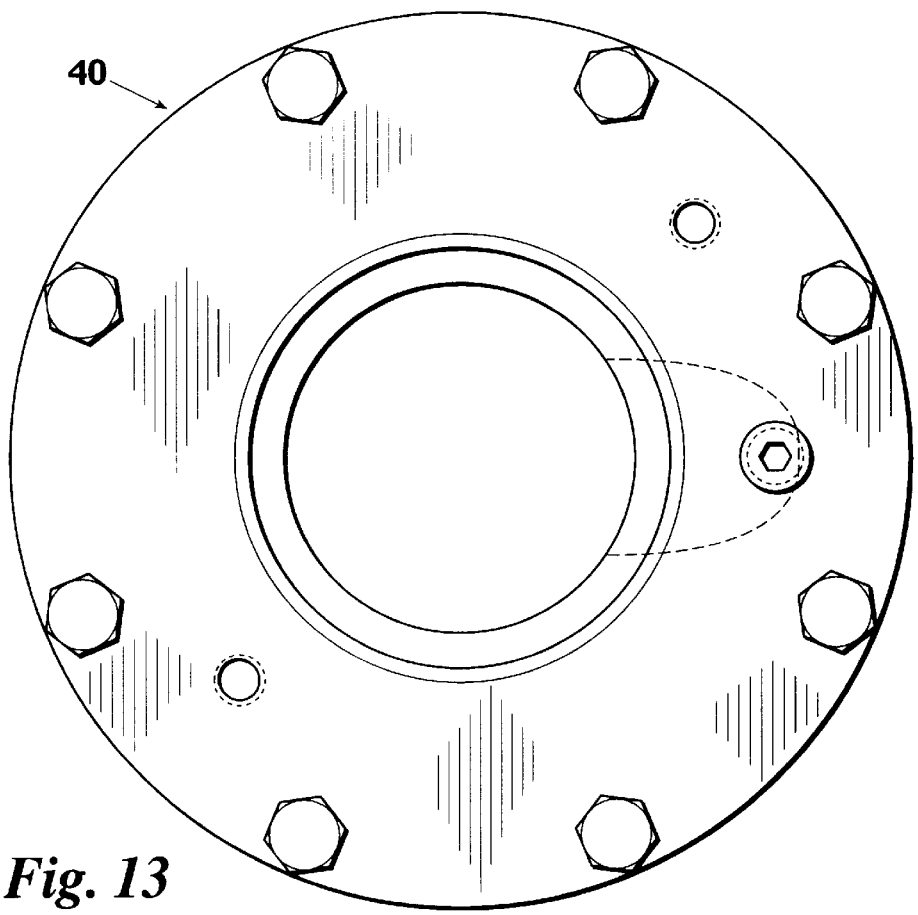
FIG. 13 is a top elevational view of the top cover of the instant invention.

Brake pack 90 consists of a stack of coaxially-aligned alternating stators 80 and friction disks 100, with the outermost element (top and bottom) of the brake pack 90 preferably being a stator. As is best illustrated in FIG. 10, a friction disk 100 contains teeth 120 on its inner diameter, which teeth 120 are matched to corresponding grooves 130 on an exterior cylindrical extension of brake driver 110. The friction disks 100 and the brake driver 110 are coaxially aligned and are splined together. Thus, rotation of the brake driver 110 about its axis results in a corresponding axial rotation of the friction disks 100. Of course, if the rotation of the friction disks 100 is retarded, a similar retardation of the brake driver 110 will occur. The stators 80 contain peripheral protrusions 85 (best viewed in FIG. 11) on their outer diameter that mate with corresponding recesses 140 on the inside of the housing 30 (FIG. 7), which arrangement secures the stators against rotation. Additionally, the inventors have found that it is advantageous from the standpoint of friction disk longevity to place two stators 80 together at the center of the brake pack 90. Thus, the stators 80 and friction disks 100 need not be strictly alternating throughout the brake pack 90.

Figure 12:
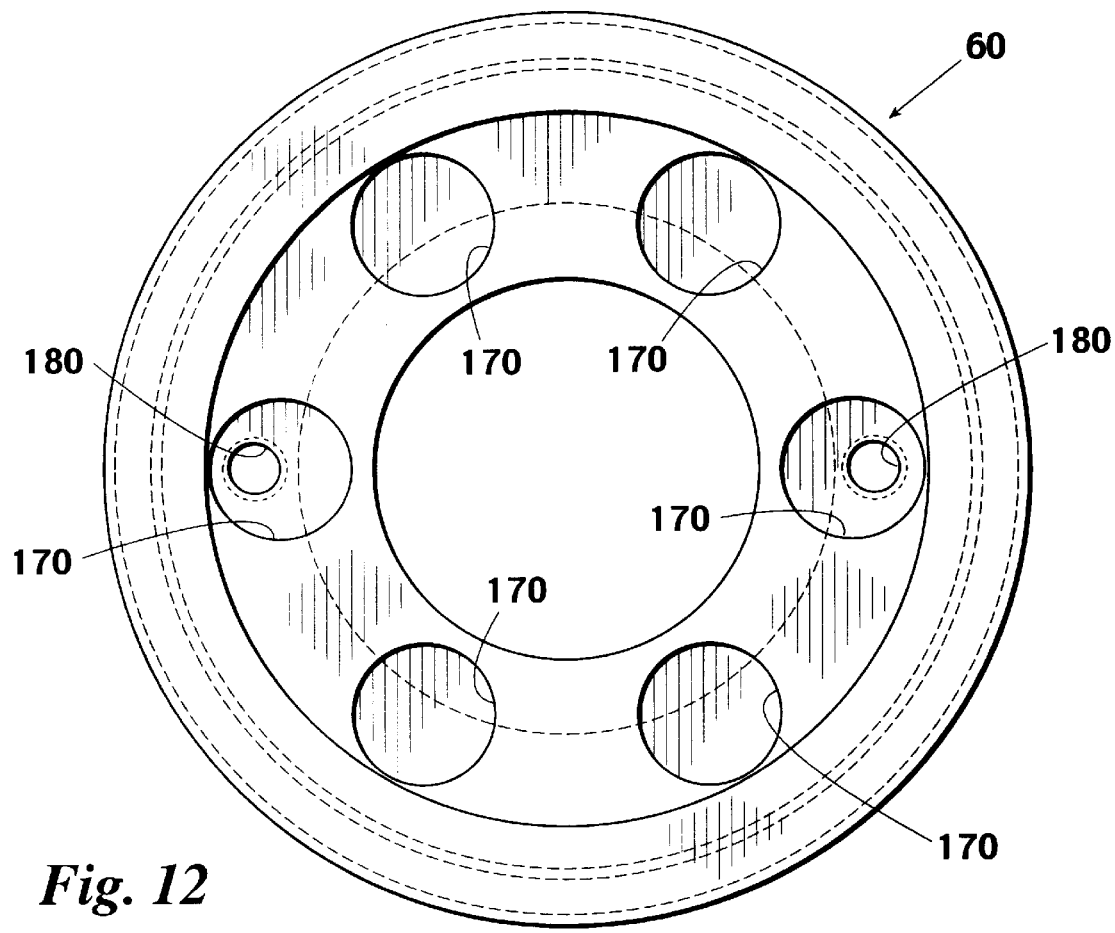
FIG. 12 is a top elevational view of the parking brake piston.
Figure 11:
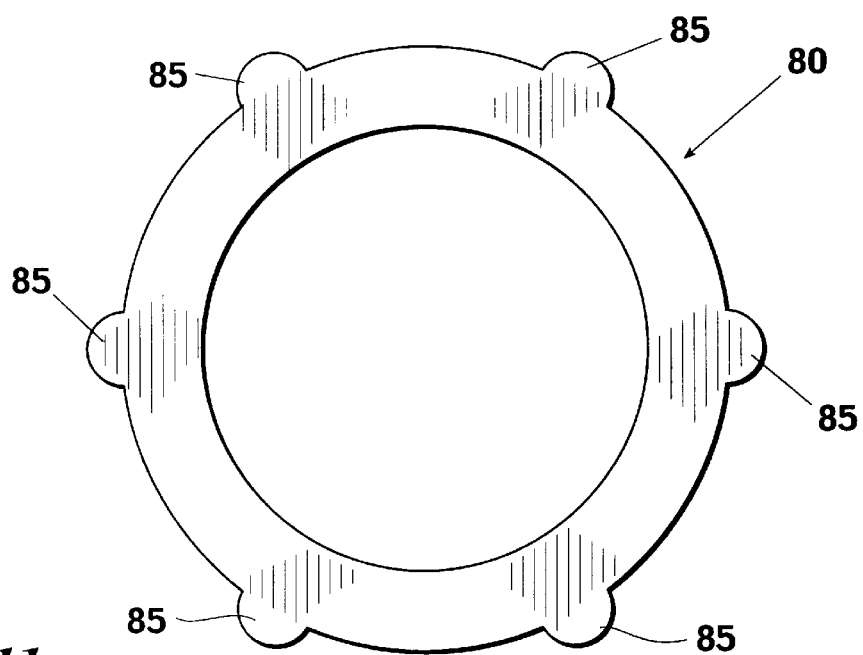
FIG. 11 is a top-elevational view of a stator.

The parking brake piston 60 is generally circular in shape and is installed coaxially with brake driver 110 and with the stators 80 and friction disks 100. On its periphery, parking brake piston 60 contains one or more o-rings 150 which provide a hydraulic seal against the pressure provided through parking brake hydraulic inlet 160. As is best illustrated in FIG. 12, on the upper surface of parking brake piston 60 are a plurality of spring depressions 170 which are sized to receive springs 50, thereby keeping them from moving during installation. Springs 50 are preferably installed in a compressed state between parking brake piston 60 and housing top member 40. Finally, threaded apertures 180 are provided to assist in the removal of the parking brake piston 60 from the housing 30 during maintenance.

Installed coaxial with parking brake piston 60—but in an opposite vertical orientation—is service brake piston 70. It is critical that service brake piston 70 be installed on the opposite side of the brake pack 90 from the parking brake piston 60, such that the two members compress the brake pack 90 from opposite directions. The service brake piston 70 also contains provisions for one or more o-rings 150 about its periphery, said o-rings 150 sealing against the pressure applied through service brake hydraulic inlet 200. Additionally, it is preferable that the upper surface of service brake piston 70 contain a plurality of cooling furrows 210, whereby coolant may be circulated through the interior of the brake, the coolant entering and exiting the device by way of circulatory coolant ports 220.

Finally, brake driver 110 rests on brake bearing 230 and bearing seal 235 and is thereby allowed to rotate freely within the brake unit. Additionally, brake driver 110 contains within both its upper (FIG. 9) and lower portions toothed apertures 240. These apertures are designed to accept similarly configured metal shafts (not pictured) with gearing on their perimeters matched to that within the apertures 240. The upper toothed aperture 240 (FIG. 9) is connected by way of an upper metal shaft to a drive motor (not shown) which is preferably bolted atop top member 40 and provides the power by which the crane may be rotated about its base. A lower metal shaft engages lower toothed aperture 240 and is in communication with the cog-type teeth on the outer surface of rotation bearing 320. Thus, a braking action applied to the friction disks 100 is translated to the brake driver 110 and then downward through the lower metal shaft, where it is ultimately applied against the cog-type teeth on the outer surface of rotation bearing 320.

In operation the braking system disclosed herein functions as follows. FIG. 4 illustrates the relative positions of the two braking pistons in the absence of hydraulic pressure. The force of springs 50 have moved the parking brake piston 60 downward until it encounters brake pack 90, which, in turn, has moved downward until it contacts service brake piston 70. The force of the springs 50 cause the brake pack 90 to be compressed between the two braking pistons, thereby braking the crane against unintended rotation. Thus, the brake pack 90 is compressed between an active parking brake piston 60 and a passive service brake piston 70. It should be noted that if the hydraulic system of the crane fails during operation, the brake pistons will automatically return to these positions.

Figure 3:
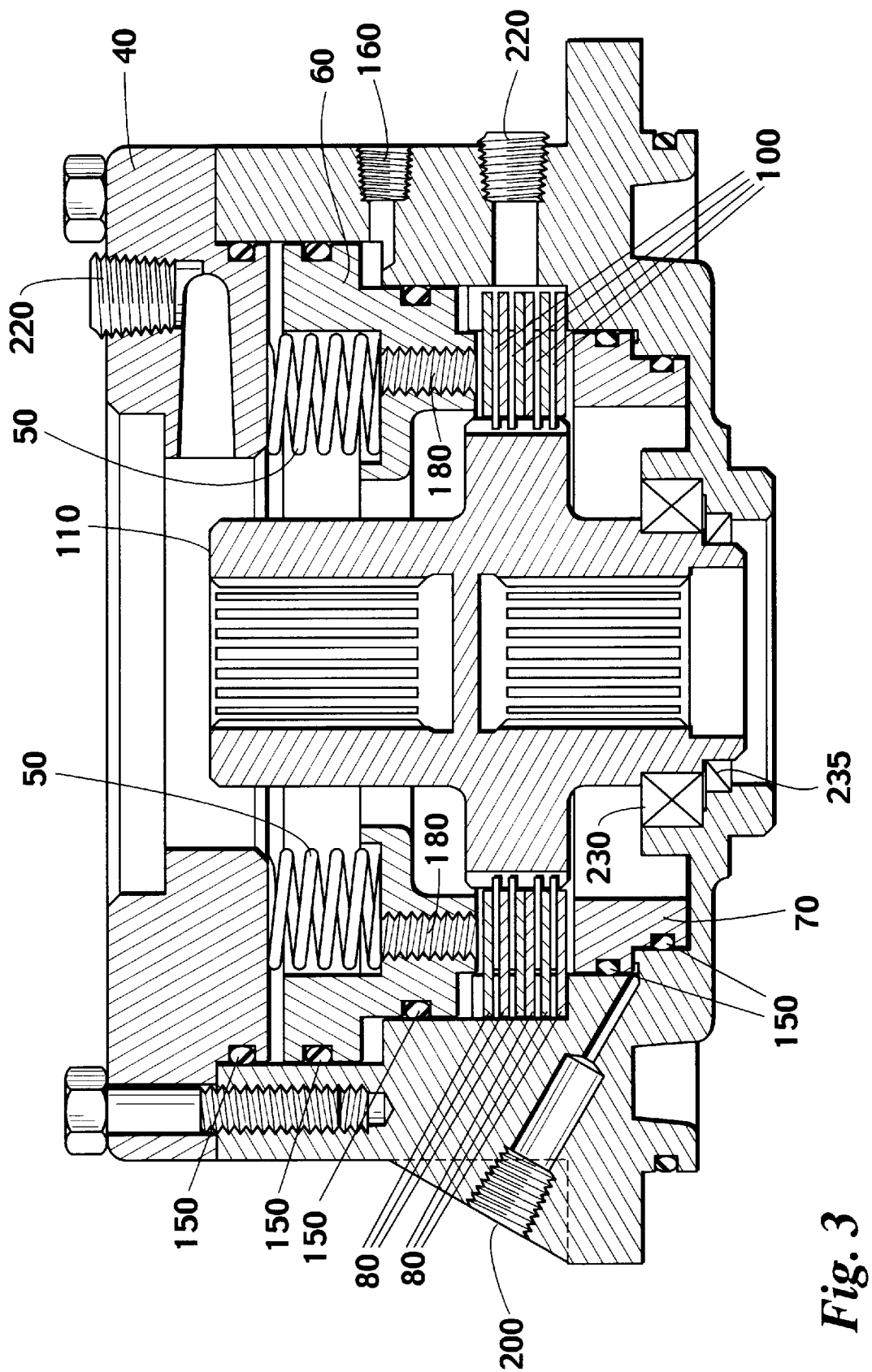
FIG. 3 is a cross sectional view of the instant invention, wherein both the parking and service brakes are disengaged.

When sufficient hydraulic pressure is supplied through parking brake hydraulic inlet 160 to overcome the compressive force of the springs 50, the parking brake piston 60 is lifted from contact with the brake pack 90, thereby freeing the friction disks 100 for rotation. This arrangement of the pistons is best seen in FIG. 3.

Finally, the service brake is used by the crane operator to control the rotation of his machine during normal operations. When the service brake is applied, hydraulic pressure is introduced to the system through service brake hydraulic inlet 200. This force raises the service brake piston 70 from its resting position, whereafter it contacts the brake pack 90 and moves it upward until it contacts parking brake piston 60, thereby initiating a braking action on the brake pack 90. Thus, the brake pack 90 is compressed between an active service brake piston 70 and a passive parking brake piston 60 (FIG. 5). Upon the removal of hydraulic pressure to the service brake piston 60, it falls away from contact with the brake pack 90 and the brake driver 110 is once again free to rotate.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A dual piston hydraulic brake for a rotating crane, having both a service brake and a parking brake, comprising:
    a stationary housing having an interior surface and a top member;
    a brake driver within said stationary housing;
    at least two non-rotational stator disks encircling said brake driver, said stator disks being coaxial with said brake driver, axially movable, and wherein there is an uppermost stator disk and a lowermost stator disk;
    at least one friction disk between said stator disks, said friction disks encircling said brake driver, being coaxial with said brake driver and said stator disks, being in communication with said brake driver, and being axially movable;
    said stator disks and said friction disks constituting a single brake pack;
    a parking brake piston coaxial with said stator disks and proximate to said uppermost stator disk;
    spring means for urging said parking brake piston against said uppermost stator disk, thereby applying braking pressure to said stator disks and friction disks;
    a first hydraulic means acting in opposition to said spring means, whereby said parking brake piston may be moved against said spring means and away from said uppermost stator disk;
    a service brake piston coaxial with said stator disks and proximate to said lowermost stator disk, said service brake piston being independent of said parking brake piston; and,
    a second hydraulic means for urging said service brake piston against said lowermost stator disk, thereby applying braking pressure to said stator disks and friction disks, said second hydraulic means being independent of said first hydraulic means.

2. A dual piston hydraulic brake according to claim 1 wherein said brake pack has an upper surface and a lower surface, and wherein said uppermost stator disk forms the upper surface of said brake pack and wherein said lowermost stator disk forms the lower surface of said brake pack.

3. A dual piston hydraulic brake according to claim 1, wherein said stator disks are interlocked at their periphery with said housing inner surface.

4. A dual piston hydraulic brake according to claim 1 wherein said service brake piston compresses said stator disks and friction disks against said parking brake piston, thereby producing a braking effect.

5. A dual piston hydraulic brake according to claim 1 wherein said parking brake piston compresses said stator disks and friction disks against said service brake piston, thereby producing a braking effect.

* * * * *